US012795398B2

(12) United States Patent
Liu et al.

(10) Patent No.: US 12,795,398 B2
(45) Date of Patent: Nov. 10, 2026

(54) METHODS FOR CONFIGURATION IN WIRELESS COMMUNICATION

(71) Applicant: ZTE Corporation, Shenzhen (CN)

(72) Inventors: Jing Liu, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 328 days.

(21) Appl. No.: 18/348,857

(22) Filed: Jul. 7, 2023

(65) Prior Publication Data

US 2023/0354066 A1 Nov. 2, 2023

Related U.S. Application Data

(63) Continuation of application No. PCT/CN2021/081828, filed on Mar. 19, 2021.

(51) Int. Cl.
*H04W 24/02* (2009.01)
*H04W 72/231* (2023.01)
*H04W 76/20* (2018.01)

(52) U.S. Cl.
CPC ......... *H04W 24/02* (2013.01); *H04W 72/231* (2023.01); *H04W 76/20* (2018.02)

(58) Field of Classification Search
CPC .... H04W 24/02; H04W 76/20; H04W 72/231
See application file for complete search history.

(56) References Cited

U.S. PATENT DOCUMENTS 12,185,250 B2 * 12/2024 Ai ........................ H04W 76/15
2012/0287902 A1 11/2012 Bufe et al.
2017/0195028 A1 * 7/2017 Shimezawa .......... H04B 7/0626
2020/0329365 A1 * 10/2020 Luo ..................... H04L 41/0803
2021/0250825 A1 * 8/2021 Purkayastha ......... H04W 36/06
2022/0264388 A1 * 8/2022 Purkayastha ......... H04W 36/06
2022/0394578 A1 * 12/2022 Wu ................... H04W 36/0061
2022/0417804 A1 * 12/2022 Freda ................ H04W 36/0061
2023/0060961 A1 * 3/2023 Kaikkonen ........... H04W 24/02
(Continued)

FOREIGN PATENT DOCUMENTS

CN 109548172 A 3/2019
CN 110034873 A 7/2019
(Continued)

OTHER PUBLICATIONS

International Search Report and Written Opinion for PCT/CN2021/081828 dated Dec. 2, 2021 (8 pages).
(Continued)

*Primary Examiner* — Michael J Moore, Jr.
(74) *Attorney, Agent, or Firm* — Foley & Lardner LLP

(57) ABSTRACT

Systems, apparatus, and methods for wireless communication are described, and more specifically, to techniques related to configuration information. One example method for wireless communication includes receiving, at a first network node, a first message from a second network node, the first message including first configuration release information corresponding to user equipment (UE) configuration information associated with the second network node and transmitting, from the first network node, a second message including second configuration release information to a third network node.

18 Claims, 17 Drawing Sheets

(56) References Cited

U.S. PATENT DOCUMENTS

| | | | | |
|---|---|---|---|---|
| 2023/0209627 A1* | 6/2023 | Wu | H04L 1/189 370/329 |
| 2023/0354066 A1* | 11/2023 | Liu | H04W 72/231 |
| 2023/0362817 A1* | 11/2023 | Da Silva | H04W 24/10 |
| 2023/0388891 A1* | 11/2023 | Wu | H04W 36/0007 |
| 2025/0220526 A1* | 7/2025 | Jeon | H04W 72/0453 |
| 2026/0150031 A1* | 5/2026 | Niu | H04W 4/70 |

FOREIGN PATENT DOCUMENTS

| | | | | |
|---|---|---|---|---|
| CN | 112219445 A | 1/2021 | |
| EP | 2 983 407 A1 | 2/2016 | |
| WO | WO-2015171040 A1 * | 11/2015 | H04W 36/0016 |
| WO | WO-2019/160743 A1 | 8/2019 | |

OTHER PUBLICATIONS

First Office Action on CN Appl. No. 202180092968.X dated Aug. 1, 2026 (18 pages with English translation).

* cited by examiner

200

300

400

500

600

700

900

1000

1400

1500

METHODS FOR CONFIGURATION IN WIRELESS COMMUNICATION

CROSS-REFERENCE TO RELATED APPLICATION

This application claims the benefit of priority under 35 U.S.C. § 120 as a continuation of PCT Patent Application No. PCT/CN2021/081828, filed on Mar. 19, 2021, the disclosure of which is incorporated herein by reference in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for transmitting configuration information in mobile communication technology, including 5th Generation (5G), and new radio (NR) communication systems.

In one exemplary aspect, a wireless communication method is disclosed. The method includes receiving, at a first network node, a first message from a second network node, the first message including first configuration release information corresponding to user equipment (UE) configuration information associated with the second network node and transmitting, from the first network node, a second message including second configuration release information to a third network node.

In another exemplary aspect, a wireless communication method is disclosed. The method includes transmitting, to a wireless device, one or more indications to perform full configuration, wherein each indication is associated with a cell group or a serving cell and causing the wireless device to discard a dedicated configuration associated with the cell group or the serving cell and apply a new configuration associated with the cell group or the serving cell.

In another exemplary aspect, a wireless communication method is disclosed. The method includes receiving, at a wireless device, one or more indications to perform full configuration, wherein each indication is associated with a cell group or a serving cell, discarding a dedicated configuration associated with the cell group or the serving cell, and applying a new configuration associated with the cell group or the serving cell.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
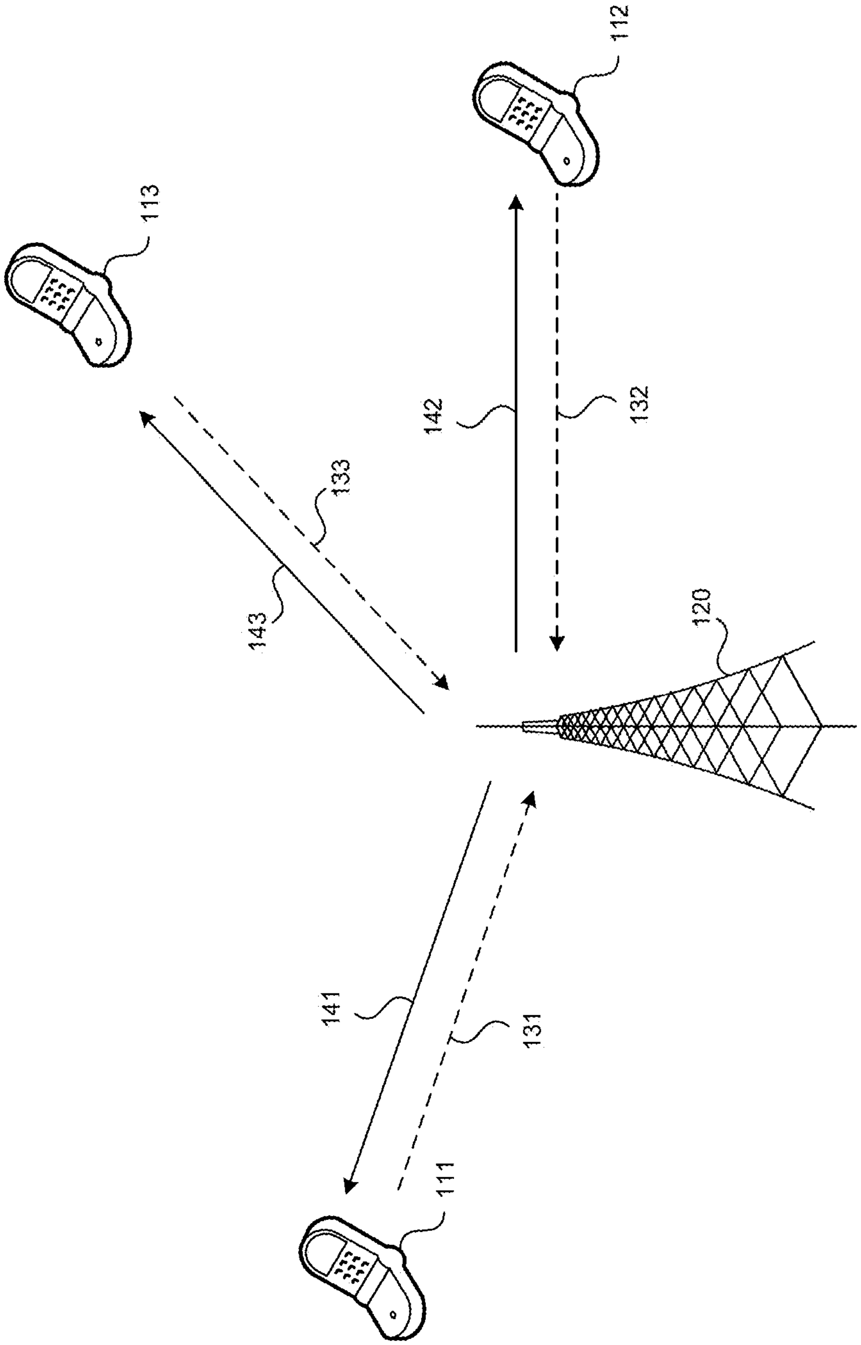
FIG. 1 shows an example of a base station (BS) and user equipment (UE) in wireless communication.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

In cellular mobile communication systems, network nodes may be implemented based on different specification versions. For instance, some network equipment may be upgraded to higher version (e.g. Release 16, or Release 17), while others are not. When user equipment (UE) accesses a network, the network can only provide configuration information according to its supported function and version. So when a UE moves across different cells, the version served by network nodes may vary. If the UE is moved from a lower version network to a higher version network, there is generally no problem, because the higher version network generally supports decoding a UE configuration configured by a lower version network. Thus, delta configuration can be applied during such a handover. However, if the UE is moved from a high version network to a low version network, the low version network may not be able to decode or recognize the configuration configured by the high version network. In this case, full configuration is required, which means the UE has to discard its previous configuration and apply a target new configuration.

To facilitate whether a target node should decide perform full configuration or delta configuration, one solution is to forward the release information of a UE's configuration in a source node to the target node. However, in new radio (NR), Next Generation Node B (gNB) can be split between Central Units (CUs) and Distributed Units (DUs). The CU and DU may also be implemented with different versions. From the CU perspective, the configuration from DU is transparent to CU, so the CU is unaware of a UE's radio configuration provided by the DU. Also, the CU is unaware of the release information corresponding to the UE's configuration in the DU. The target node may also support a CU/DU split, making it unclear how to obtain and process the configuration release information from the source node.

Furthermore, when a UE is configured with dual connectivity, when network triggers full configuration to a master cell group (MCG), the full configuration applies to both (MCG) and secondary cell group (SCG) configurations, which means the UE has to discard the current MCG and SCG configurations, and apply new MCG and SCG configurations. This will cause data interruption to both MCG and SCG transmissions, resulting in a worse user experience. Thus, it is desired to support full configuration to a specific cell group without impacting other cell groups. This similarly applies to carrier aggregation (CA) and multiple connectivity scenarios.

In a Long-Term Evolution (LTE) system, during a handover preparation procedure, the source cell can send a HandoverPreparationInformation message to the target cell. This message includes a UE's configuration in the source cell. In addition, this message can also include a field "ue-ConfigRelease-r9", which indicates the release information corresponding with the radio configuration dedicated for the source. Based on this indication, the target cell can immediately determine whether full configuration is needed. For instance, if the indication is set to "rel15", but the target cell only supports release-14 or lower functions, then the target cell can trigger full configuration without decoding the source configuration.

For full configuration over the Uu interface in Multi-Radio Dual Connectivity (MR-DC), when the Master Node (MN) includes a "fullConfig" indication in a Radio Resource Control (RRC) message, the UE applies full configuration to both the MCG and SCG configurations. To apply full configuration to only the SCG, releasing and re-adding the SCG is required. Applying full configuration to only the MCG is not supported.

Similarly, in the case of CA, when a network includes a "fullConfig" indication in an RRC message, the UE applies full configuration to both the PCell and SCell configurations. To apply full configuration to only the SCell, releasing and re-adding the SCell is acquired. Applying full configuration to only the PCell is not supported.

FIG. 1 shows an example of a wireless communication system (e.g., a long term evolution (LTE), 5G or NR cellular network) that includes a base station (BS) 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Overview

The present embodiments relate to techniques that can be implemented for exchanging a UE's configuration release information between different radio access network (RAN) elements, such as from gNB-DU to gNB-CU, from gNB-CU to gNB-DU, from a source cell to a target cell, from a secondary node (SN) to an MN, or from an MN to a SN. Also disclosed are techniques that can be implemented for transmitting a full configuration indication from a network to UE.

UE Configuration Release Information Transmitted Between DU and CU

When a DU transmits configuration release information to CU, the information can comprise the release information corresponding to a UE's current configuration in the DU.

In some embodiments, the corresponding UE configuration in the DU can be:

1) UE's radio configuration in a primary cell (e.g. PCell or PSCell);
2) UE's radio configuration in a secondary cell (SCell) (e.g. MCG SCell or SCG SCell); or
3) UE's radio configuration in all serving cells of a cell group (e.g. MCG or SCG);

In some embodiments, the form of configuration release information can be one of the following:

1) General release version number, e.g., "release 15", "release 16", . . . etc; or
2) Detailed release version number, e.g., "v1510", "v1520", . . . "v1610", . . . etc;

The configuration release information can be transmitted on a per-UE level, a per-serving cell level, or a per feature/function level. The configuration release information can also be transmitted on both a per-serving cell and per feature/function level simultaneously.

A DU can transmit configuration release information to CU upon one of following procedures:

1) Procedure 1: A DU transmits configuration release information to a CU when the DU receives a configuration query request from the CU.
2) Procedure 2: A DU transmits configuration release information to the CU when the configuration in the DU changes.

EXAMPLE 1

Figure 2:
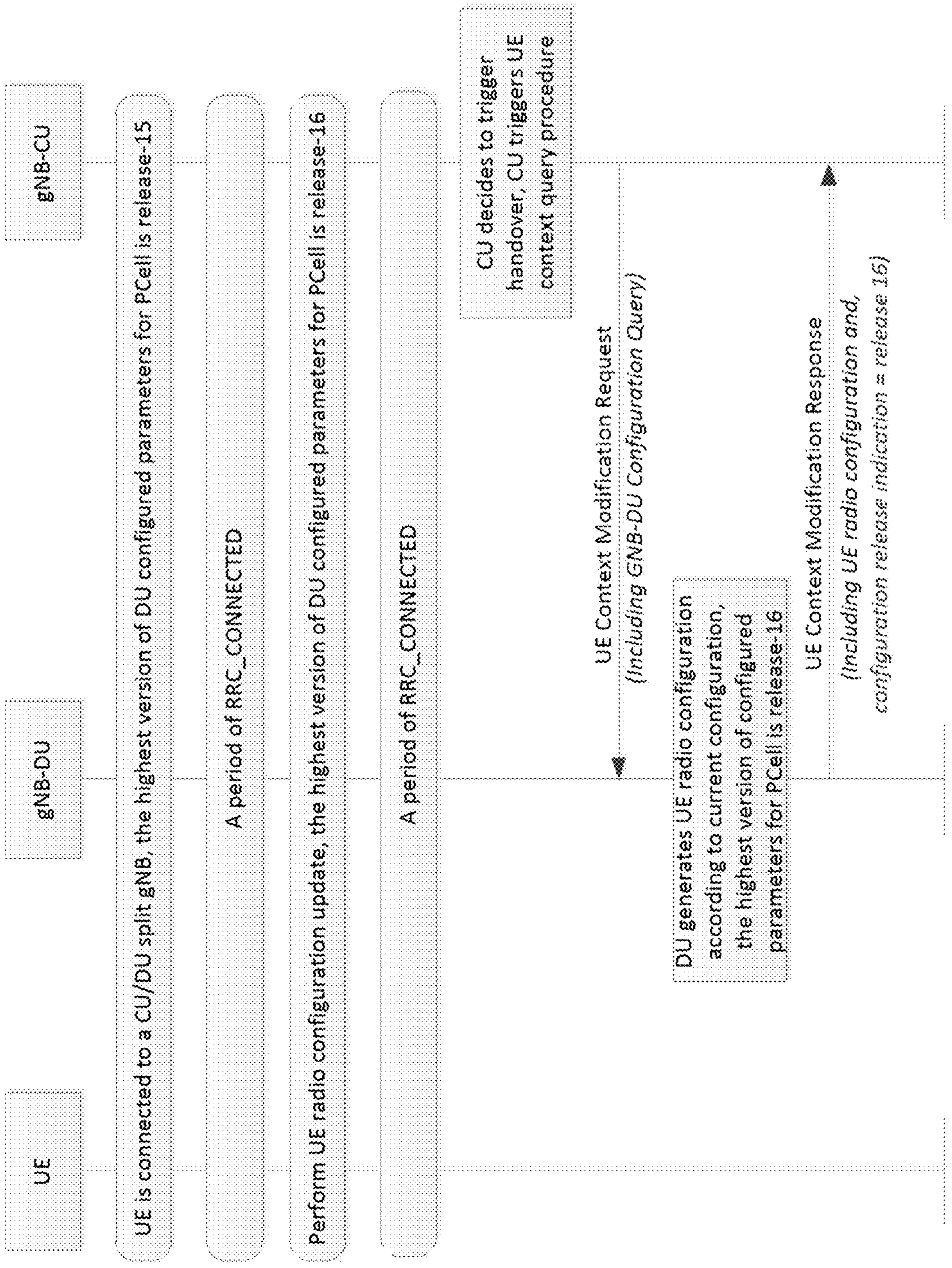
FIG. 2 shows an example method 200 of transmitting configuration release information.

FIG. 2 shows an example method 200 of transmitting configuration release information. In this example, a Release 16 version UE is connected to a CU/DU split gNB, and both gNB CU and gNB DU support Release 16 functions. The UE is configured with both a PCell and an SCell. At time T1, only Release 15 functions are enabled for the UE's radio configuration for the PCell in DU, which means the UE is configured with only Rel-15 configuration and parameters. At time T2, the network triggers a UE radio configuration update, enabling both Release 15 and Release 16 functions, so the UE is configured with both Rel-15 and Rel-16 configurations and parameters.

Next, when the network wants to trigger a handover procedure, the source cell needs to send the UE's source context to the target cell during a handover preparation procedure. To obtain the UE's current configuration in the source cell, the source gNB-Control Unit (gNB-CU) transmits a request to the source gNB-Distributed Unit (gNB-DU) to send the UE's configuration in the DU to the source gNB-CU. This is done by sending a UE Context Modification Request message from the source CU to the source DU, where the message includes a "GNB-DU Configuration Query" information element (IE).

After receiving the UE Context Modification Request message from the CU, the source DU sends the UE's current radio configuration in the DU to the CU in the UE Context Modification Response message. Within this message, the DU also includes a DU configuration release indication, with value set to "release 16", which indicates the release of the UE's current PCell configuration in the source DU. The release indication may be carried explicitly in the UE Context Modification Response message, or it may be carried in a container (e.g., DU to CU RRC Information) included in the UE Context Modification Response message.

EXAMPLE 2

Figure 3:
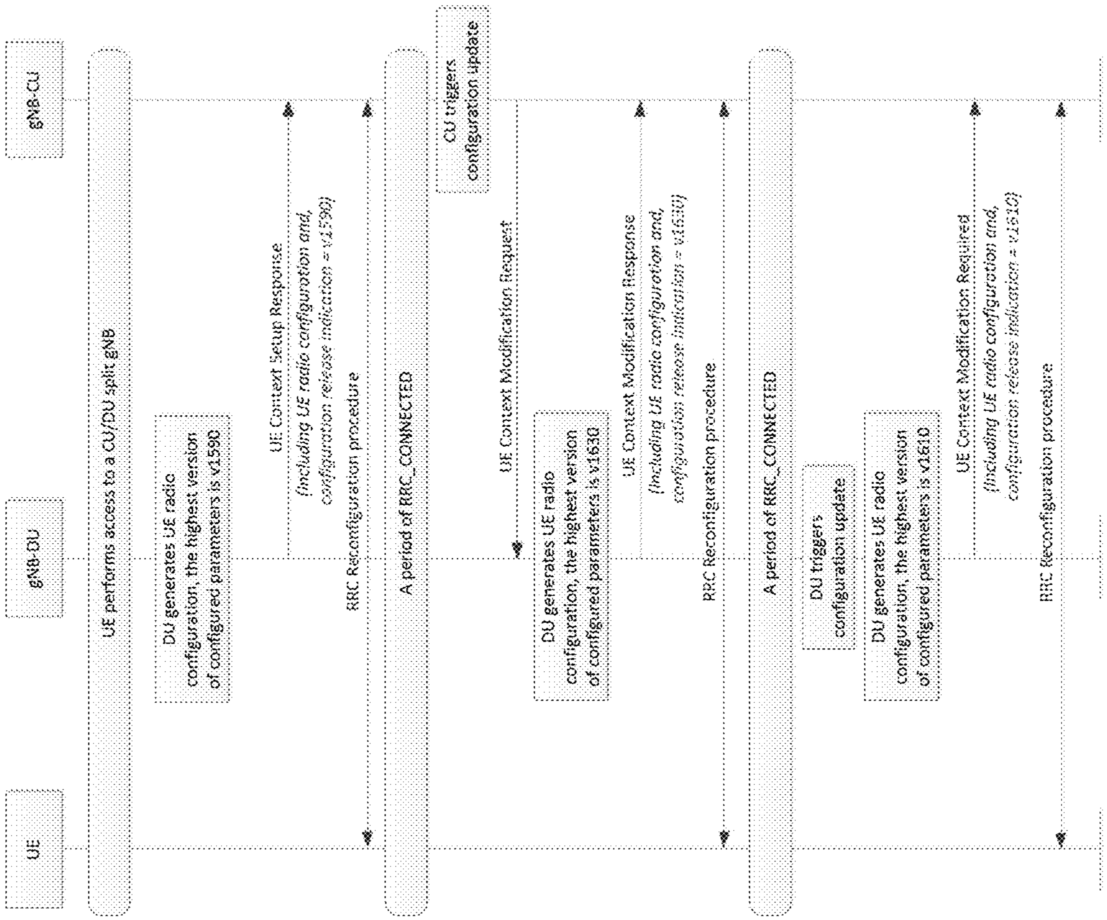
FIG. 3 shows an example method 300 of transmitting configuration release information.

FIG. 3 shows an example method 300 of transmitting configuration release information. A Release 16 version UE is connected to a CU/DU split gNB, and both the gNB CU and gNB DU support Release 16 functions. The UE is configured with both a PCell and an SCell.

Regarding the UE's radio configuration for both PCell and SCell in the DU, during initial access, only Release 15 functions are enabled, which means the UE is configured with Rel-15 configurations and parameters. In this example, the highest version of parameters configured for the UE is v1590. When the DU generates the radio configuration, the DU sends the configuration to CU in a UE Context Setup Response message, and the CU can then send the configuration to the UE. Within the UE Context Setup Response message, the DU also includes a configuration release indication, with value set to "v1590". The release indication may be carried explicitly in the UE Context Setup Response message, or it may be carried in a container (e.g., DU to CU RRC Information) included in the UE Context Setup Response message.

Later, the CU triggers a configuration update, which may be initiated upon, for example, a Dedicated Radio Bearer (DRB) setup or release, a bearer type change, etc. The CU sends a UE Context Modification Request to the DU. The DU then generates a new radio configuration. The new radio configuration can include Release 16 configuration or parameters, and the highest version of the parameters configured to UE can be v1630. Then the DU sends the radio configuration to the CU in a UE Context Modification Response message. Within the message, the DU also includes a new DU configuration release indication, with value set to "v1630".

Later, the DU triggers a configuration update and generates a new radio configuration, the new radio configuration including a Release 16 configuration and parameters. The highest version of the parameters configured to the UE is v1610. Then the DU sends the new radio configuration to the CU in a UE Context Modification Required message. Within the message, DU also includes a new DU configuration release indication, with value set to "v1610". The release indication may be carried explicitly in the UE Context Modification Response message, or it may be carried in a container (e.g. DU to CU RRC Information) included in the UE Context Modification Response message.

EXAMPLE 3

Figure 4:
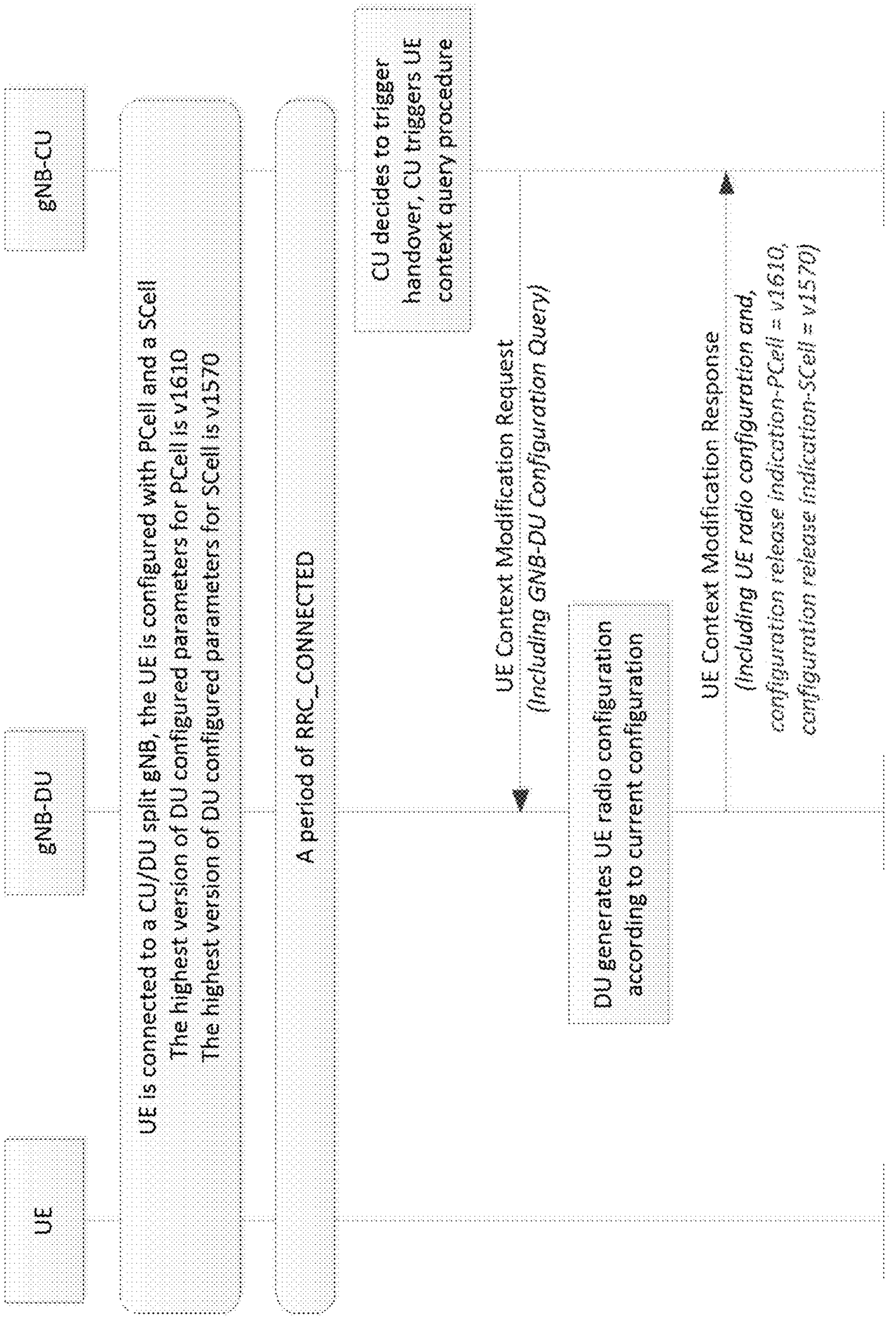
FIG. 4 shows an example method 400 of transmitting configuration release information.

FIG. 4 shows an example method 400 of transmitting configuration release information. In this example, a Release 16 version UE is connected to a CU/DU split gNB, and both the gNB-CU and the gNB-DU support Release 16 functions. The UE is configured with both a PCell and a SCell. Regarding the UE's radio configuration of the PCell in the DU, both Release 15 and Release 16 functions are enabled, and the highest version parameters of the PCell configured for the UE is v1610. Regarding the UE's radio configuration of the SCell in the DU, only Release 15 functions are enabled, and the highest version parameters of the SCell configured for the UE is v1570.

When the network wants to trigger a handover procedure, the source cell needs to send the UE's source context to the target cell during a handover preparation procedure. To obtain the UE's current configuration in the source cell, the source gNB-CU sends a request to the source gNB-DU to send the UE's configuration in the DU to the source gNB-CU. This is done by sending a UE Context Modification Request message from the source CU to the source DU, where the message includes a "GNB-DU Configuration Query" IE.

After receiving the UE Context Modification Request message from the CU, source DU sends the UE's current DU radio configuration to the CU in UE Context Modification Response message. Within the message, the DU also includes a DU configuration release indication associated with the PCell, with value set to "v1610", and a DU configuration release indication associated with the SCell, with value set to "v1570". The release indications may be carried explicitly in the UE Context Modification Response message, or they may be carried in a container (e.g. DU to CU RRC Information) included in the UE Context Modification Response message.

EXAMPLE 4

Figure 5:
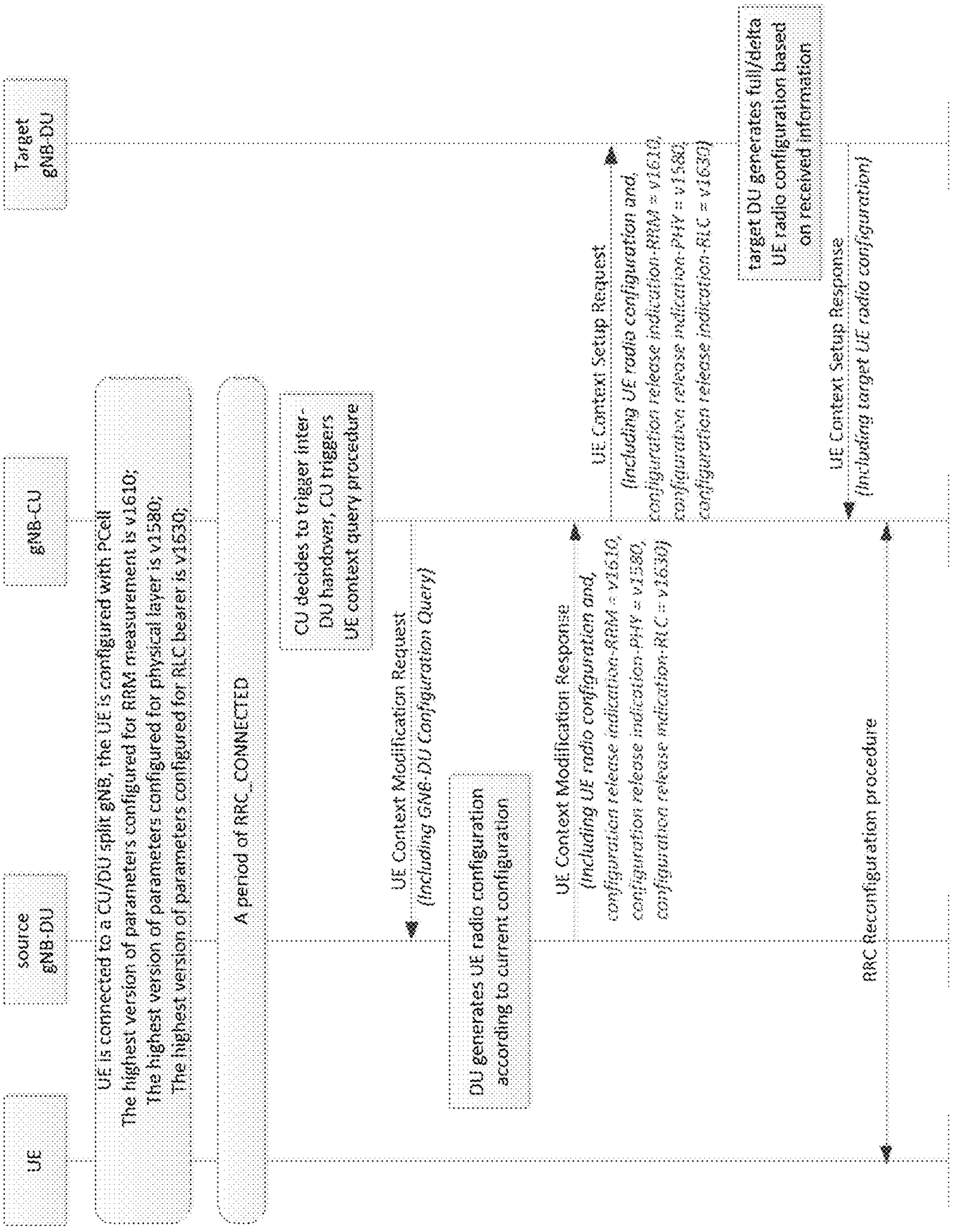
FIG. 5 shows an example method 500 of transmitting configuration release information.

FIG. 5 shows an example method 500 of transmitting configuration release information. In this example, a Release 16 version UE is connected to a CU/DU split gNB, and both the gNB-CU and the gNB-DU support Release 16 functions. The UE is configured with the PCell. Regarding the UE's radio configuration in the DU, multiple functions are enabled, but the highest version parameters according to each enabled function are different. For example, the highest version parameters configured for a Radio Resource Measurement (RRM) measurement is "v1610"; the highest version parameters configured for the physical layer is "v1580"; and the highest version parameters configured for a Radio Link Control (RLC) bearer is "v1630".

When the network wants to trigger handover procedure, the source cell needs to send the UE's source context to the target cell during a handover preparation procedure. To obtain the UE's current configuration in the source cell, the source gNB-CU sends a request to the source gNB-DU to send the UE's configuration in the DU to the source gNB-CU. This is done by sending a UE Context Modification Request message from the source CU to the source DU. The message includes a "GNB-DU Configuration Query" IE.

After receiving the UE Context Modification Request message from the CU, the source DU sends the UE's current DU radio configuration to the CU in a UE Context Modification Response message. Within this message, the source DU also includes a list of DU configuration release indications, wherein each configuration release indication is associated with a given function. For example, the configuration release indications can have values "v1610" for the RRM measurement, "v1580" for the physical layer configuration, and "v1630" for the RLC bearer configuration. The release indications may be carried explicitly in a UE Context Modification Response message, or they may be carried in a container (e.g., DU to CU RRC Information) included in the UE Context Modification Response message.

If the handover procedure is an intra-CU and inter-DU change, then the CU can forward the UE radio configuration from the source DU to the target DU, together with the list of configuration release indications.

If the target DU supports Release 16 functions, then the target DU decides whether to trigger full configuration or delta configuration based on the received release indications. For instance, if the target DU supports a v1610 configuration for the RRM measurement, then the target DU generates a delta RRM configuration for the UE. If target DU supports a v1630 configuration for the physical configuration, then the target DU generates a delta physical configuration for the UE. If the target DU only supports v1610 configuration for the RLC bearer configuration, then the target DU generates a full Packet Data Convergence Protocol (PDCP) configuration for the UE. The generated configuration can be sent to the UE as part of a handover command.

UE Configuration Release Information Transmitted from Source Node to Target Node During a handover preparation period, a source node transmits configuration release information to a target node, wherein the configuration release information comprises the release information corresponding to a UE's current configuration in the source node.

The configuration release information can include one or more of the following:

1) Configuration release information corresponding to the UE's radio configuration in a CU of a serving cell in the source node.
2) Configuration release information corresponding to the UE's radio configuration in a DU of a serving cell in the source node.

The form of configuration release information can be one of the following:

1) General release version number, e.g., "release 15", "release 16", etc.
2) Detailed release version number, e.g., "v1510", "v1520" . . . "v1610", etc.

Optionally, the configuration release information can be transmitted on a per-UE level, a per-serving cell level, a per-cell group level, a per feature/function level, a per-serving cell and per feature/function level, or per-cell group and per feature/function level.

The serving cell can be any configured serving cell, such as a PCell, a MCG SCell, a PSCell, a SCG SCell, or another indicated serving cell in multiple connectivity.

The cell group can be any configured cell group, such as a master cell group (MCG), a secondary cell group (SCG), or another indicated cell group in multiple connectivity.

The configuration release information associated with a DU can be transmitted using a container, which is transparent to CU.

During a handover procedure, after the target node receives the configuration release information from a source node, the CU in the target node can transmit the source DU related configuration release information to the DU in the target node. The DU in the target node can then generate the UE's radio configuration based on this information, e.g., whether to trigger full configuration or delta configuration.

In dual connectivity or multiple connectivity, after an MN or target MN receives the configuration release information corresponding to a source secondary cell group, the MN or target MN can transmit the configuration release information corresponding to the source secondary cell group to the target secondary cell group.

The configuration release information corresponding to the source secondary cell group can be transmitted to the MN using a container, which is transparent to MN.

EXAMPLE 1

Figure 6:
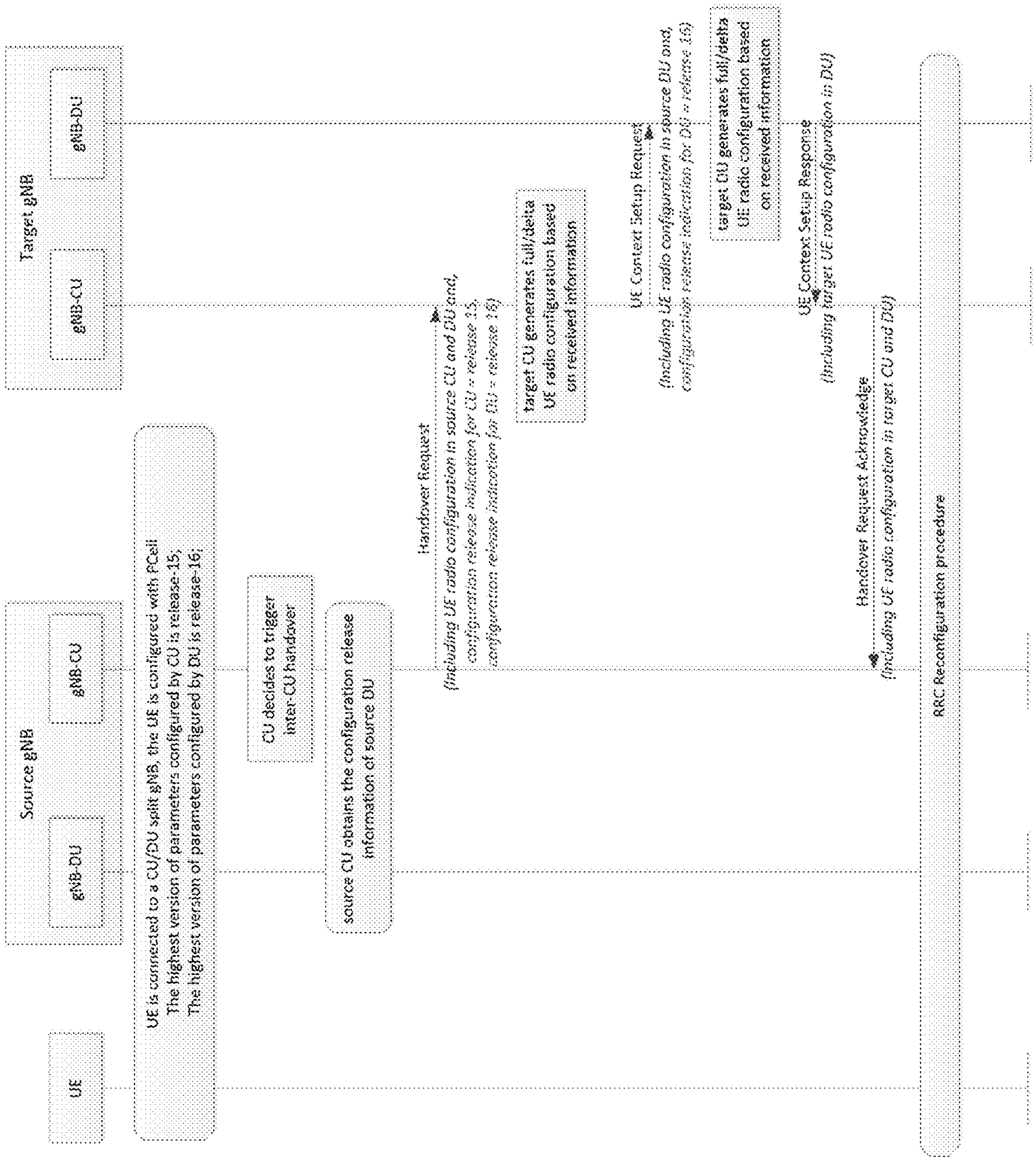
FIG. 6 shows an example method 600 of transmitting configuration release information.

FIG. 6 shows an example method 600 of transmitting configuration release information. In this example, a Release 16 version UE is connected to a CU/DU split gNB. The gNB-CU only supports Release 15 functions and the gNB-DU supports Release 15 and Release 16 functions. The UE is configured with only PCell.

Regarding the UE's configuration in the CU, only Release 15 functions are enabled, which means the UE is configured with Rel-15 configurations and parameters in the CU. Regarding the UE's radio configuration in the DU, both Release 15 and Release 16 functions are enabled, which means the UE is configured with both Rel-15 and Rel-16 configurations and parameters in the DU.

During a handover preparation procedure, the source cell transmits a Handover Request message to the target cell. The Handover Request message includes the UE's configuration in the source CU and source DU. In addition, the message also includes a configuration release indication associated with source CU, with a value set to "release 15"; and a configuration release indication associated with the source DU, with a value set to "release 16". The release indication associated with the source DU may be carried explicitly in the Handover Request message or may be carried in a container, transparent to CU, included in the Handover Request message.

The target node can also support a CU/DU split. After receiving the Handover Request message, if the target CU supports Release 15 or higher, then the target CU further decodes the received UE configuration of the source CU and generates a new delta CU configuration based on it.

In addition, the target CU can forward the UE's source DU configuration together with the configuration release indication associated with the source DU to the target DU. If the target DU supports Release 16 functions or higher, then the target DU further decodes the received UE configuration of the source DU and generates a new delta DU configuration based on it. If the target DU only supports Release 15 functions or lower, then the target DU directly generates a full DU configuration for the UE.

The generated CU or DU configuration can be sent to the UE as part of handover command.

EXAMPLE 2

Figure 7:
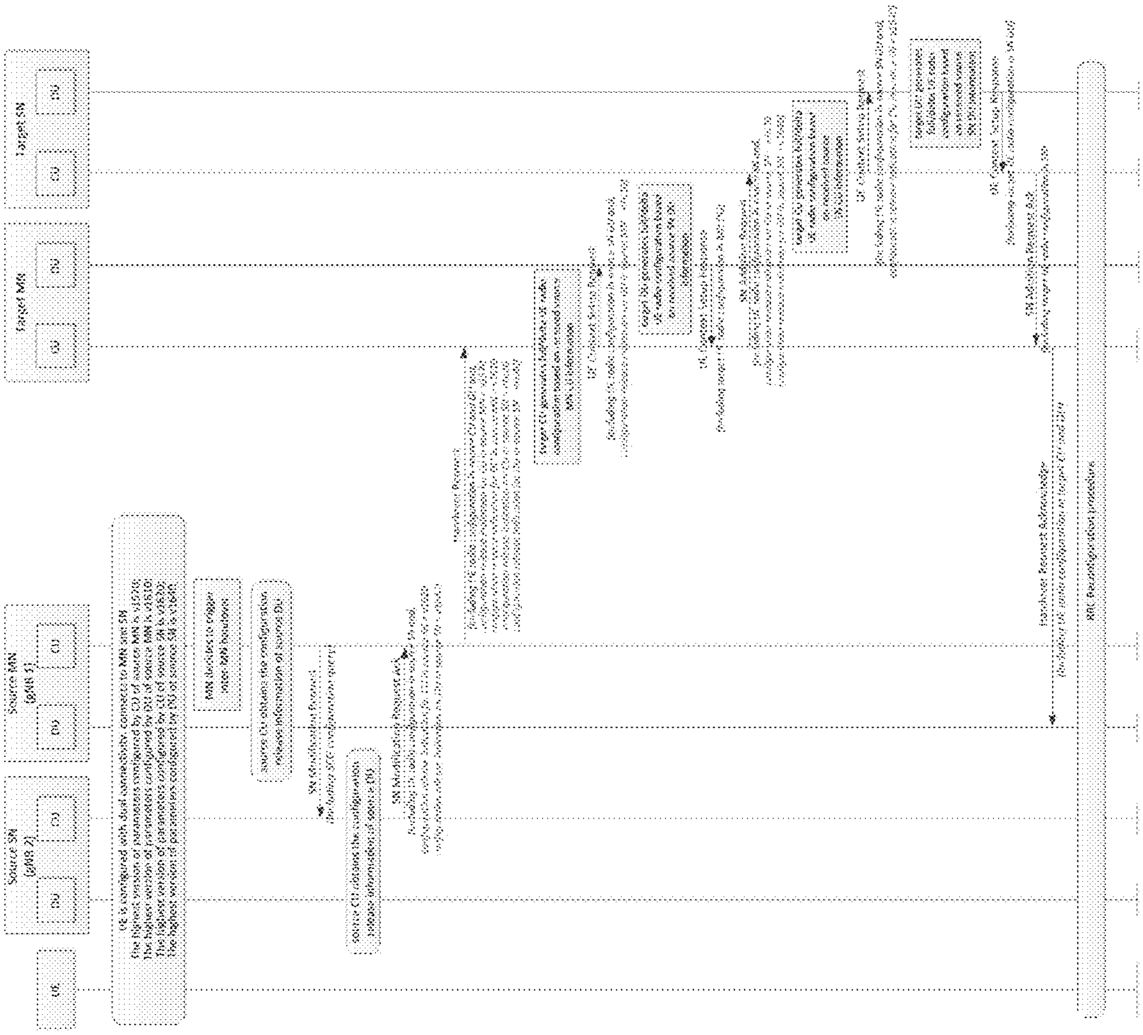
FIG. 7 shows an example method 700 of transmitting configuration release information.

FIG. 7 shows an example method 700 of transmitting configuration release information. In this example, Release 16 version UE is configured with New Radio Dual Connectivity (NR-DC). The UE is connected to a CU/DU split, gNB1, which acts as an MN. The UE is also connected to another CU/DU split, gNB2, which acts as an SN.

Regarding UE's configuration in the source MN and SN, the highest version parameters configured with the source MN and SN are listed as below:

1) v1570 for configuration in gNB1-CU in source MN;
2) v1610 for configuration in gNB1-DU in source MN;
3) v1620 for configuration in gNB2-CU in source SN;
4) v1640 for configuration in gNB2-DU in source SN.

Before an inter-MN handover procedure, the source MN can obtain the UE's configuration in the source SN's CU and source SN's DU from the source SN, along with a configuration release indication from the source SN (see above bullets (3) and (4)).

During a handover preparation procedure, the source MN transmits a Handover Request message to the target SN. The message includes the UE's configuration in the source MN and source SN (including both CU and DU configurations). In addition, the message also includes a configuration release indication associated with the CU of the source MN, with a value set to "v1570"; a configuration release indication associated with the DU of the source MN, with a value set to "v1610"; a configuration release indication associated with the CU of the source SN, with a value set to "v1620"; and a configuration release indication associated with the DU of the source SN, with a value set to "v1640". The configuration release indications associated with the CU or DU of the source SN may be transmitted via a container, transparent to MN, included in the Handover Request message.

The target MN also supports a CU/DU split. after receiving the Handover Request message, if the CU of the target MN supports v1570 configuration or higher, then the CU of the target MN further decodes the received UE configuration of the source MN's CU and generates a new delta MN CU configuration based on it. If the CU of the target MN does not support a v1570 configuration, then the CU of the target MN directly generates a full MN CU configuration for the UE.

Moreover, the CU of the target MN can forward the UE's source MN's DU configuration together with the configuration release indication associated with the source MN's DU to the DU of the target MN. If the DU of target MN supports v1610 or higher, then the DU of the target MN further decodes the received UE configuration of the source MN's DU and generates a new delta DU configuration based on it. If the DU of target MN does not support a v1610 configuration, then the DU of the target MN directly generates a full MN DU configuration for the UE.

In addition, the target MN can decide to change SN and select a new SN for the UE. In this case, the target MN can forward the UE's source SN configuration together with a configuration release indication associated with the source SN's CU and source SN's DU to the target SN. The CU of the target SN may further forward the UE's source SN's DU configuration together with configuration release indication associated with the source SN's DU to the DU of the target SN.

If the CU of the target SN supports v1620 configuration or higher, then the CU of the target SN further decodes the received UE configuration of the source SN's CU and generates a new delta CU configuration based on it. If the CU of the target SN does not support a v1620 configuration, then the CU of the target SN directly generates a full SN CU configuration for the UE.

If the DU of the target SN supports v1640 configuration or higher, then the DU of the target SN further decodes the received UE configuration of source SN's DU and generates a new delta DU configuration based on it. If the DU of the target SN does not support a v1640 configuration, then the DU of the target SN directly generates a full SN DU configuration for the UE.

The generated MN's and SN's CU or DU configurations can be sent to the UE as part of handover command.

Figure 8:
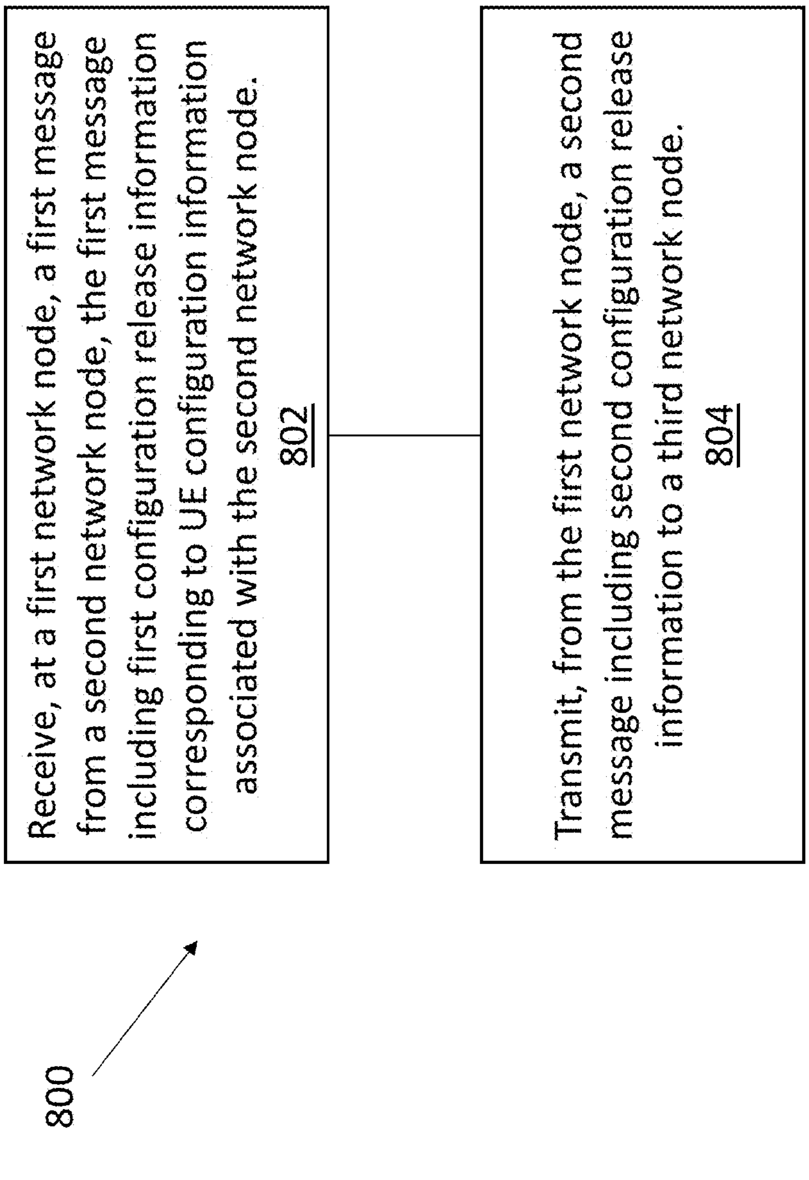
FIG. 8 shows an example method 800 of transmitting configuration release information.

FIG. 8 shows an example method 800. At 802, a first network node receives a first message from a second network node, the first message including first configuration release information corresponding to UE configuration information associated with the second network node. At 804, a second message is transmitted from the first network node to a third network node, the second message including second configuration release information. The second configuration release information can correspond to UE configuration information associated with the second network node and/or UE configuration information associated with the first network node. The first message can be received at the first network node in response to the second network node receiving a configuration query request from the first network node. The first message can be also received when configuring or updating UE configuration information at the second network node. In some embodiments, the first network node is a first MN, the second network node is an SN, and the third network node is a second MN. In some embodiments, the first network node is a CU, the second network node is a DU, and the third network node is a second CU.

In some embodiments, the method 800 can further comprise transmitting, from the third network node to a fourth network node, a third message including third configuration release information and determining, by the fourth network node, whether to use full configuration based on the third configuration release information. The third configuration release information can correspond to UE configuration information associated with, for example, the second network node. The first, second, and third configuration release information can be associated with a UE, a serving cell, a cell group, a function, a serving cell and function, or a cell group and function. The first, second, and third configuration release information can include a general release version number or a detailed release version number. The fourth network node can be a second SN or a second CU.

Full Configuration Indication from Network to UE

In dual connectivity or multiple connectivity scenarios, a UE can receive a full configuration indication from a network, and the full configuration indication can be associated with a cell group or a serving cell.

When the UE receives the full configuration indication associated with a cell group, the UE discards the old configuration associated with the cell group and applies the new cell group configuration provided by the network.

When the UE receives the full configuration indication associated with a serving cell, the UE discards the old configuration associated with the serving cell and applies the new serving cell configuration provided by the network.

The discarded configuration can comprise one or more of the following:

1) Radio configuration
2) RLC bearer configuration
3) PDCP bearer configuration
4) Measurement configuration
5) Security configuration The cell group can be any configured cell group, such as an MCG, SCG, or other indicated cell group in multiple connectivity.

The serving cell can be any configured serving cell, such as PCell, an MCG SCell, PSCell, a SCG SCell, or other indicated serving cell in multiple connectivity.

The cell group or serving cell associated with the full configuration indication can be explicitly or implicitly indicated by the network when sending the full configuration indication to the UE.

Explicitly indicating the full configuration can include the following:

1) An explicit parameter, wherein the value range of the parameter includes one or more of: MCG, SCG, PCell, PSCell, MCG SCell, or SCG SCell; or
2) An explicit parameter indicating an index of cell group or serving cell.

Implicitly indicating the full configuration can include:

1) Expressing the name of full configuration indication parameter. For instance, the full configuration indication parameter can be named as "fullConfig-MCG", "fullConfig-SCG".
2) Expressing the location of the full configuration indication in a message. For instance, the full configuration indication included in an MCG configuration can imply a full configuration for MCG, the full configuration indication included in an SCG configuration can imply the full configuration for an SCG, the full configuration indication included in a PCell configuration can imply the full configuration indication for a PCell, etc.

The UE can receive one or more full configuration indications associated with a different cell group or serving cell at the same time.

The full configuration indication can be sent via an RRC message, MAC CE, or DCI. If the indication is included in an RRC message, the RRC message can be an RRC Reconfiguration message, an RRC Resume message, or an RRC Reestablishment message.

When performing full configuration on a cell group, the cell group can be in any state, such as an activation state, a deactivation state, or a dormancy state.

When performing full configuration on a serving cell, the serving cell can be in any state, such as an activation state, a deactivation state, or a dormancy state.

The new configuration being applied upon full configuration can be provided in the same message as a full configuration indication. The new configuration can also be pre-configured by the network in a previous message.

EXAMPLE 1

Figure 9:
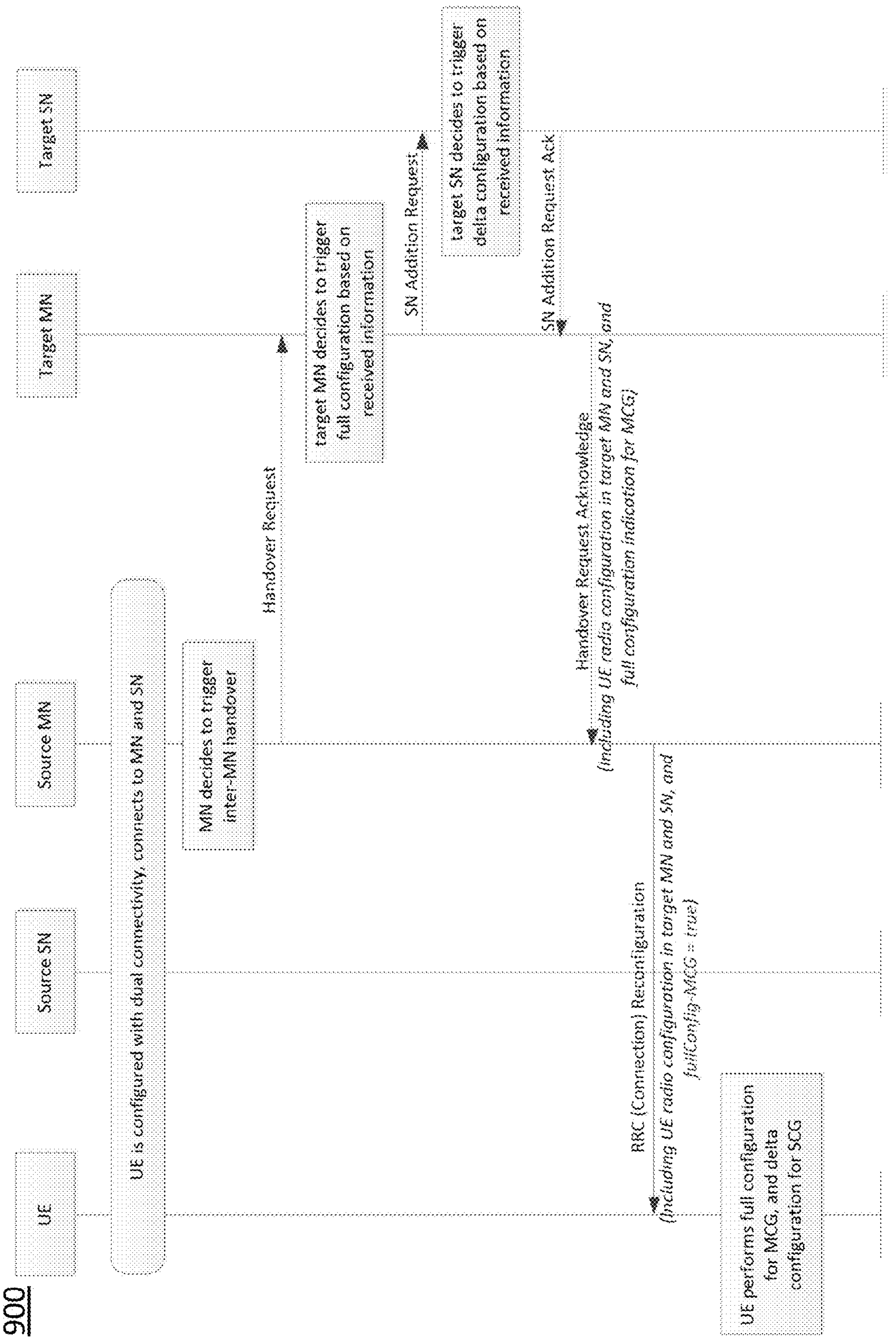
FIG. 9 shows an example method 900 of implementing full configuration.

FIG. 9 shows an example method 900 of implementing full configuration. In this example, an E-UTRAN New Radio—Dual Connectivity (EN-DC) compatible UE is connected to eNodeB (eNB), an MN, and gNB, an SN. The network triggers an inter-MN handover without an SN change procedure. During this procedure, the target MN triggers full configuration for MCG, and the target SN decides to trigger a delta configuration for SCG.

The RRC reconfiguration (handover command) message is sent by the source MN. Within the RRC reconfiguration message, in addition to the target MCG radio configuration and the target SCG radio configuration, the message also includes a full configuration indication. The full configuration indication is named, for example, "fullConfig-MCG" or "fullConfig-MN", with value set to true.

After the UE receives this RRC reconfiguration (handover command) message, based on the MCG full configuration indication, the UE discards one or more of following configurations currently configured for MCG: a radio configuration, an RLC bearer configuration, a PDCP bearer configuration, a measurement configuration, or a security configuration. Then the UE applies the new MCG configuration received in the message. For the SCG configuration, since the full configuration indication for SCG was not received, the UE can directly apply the new SCG configuration received in the message.

EXAMPLE 2

Figure 10:
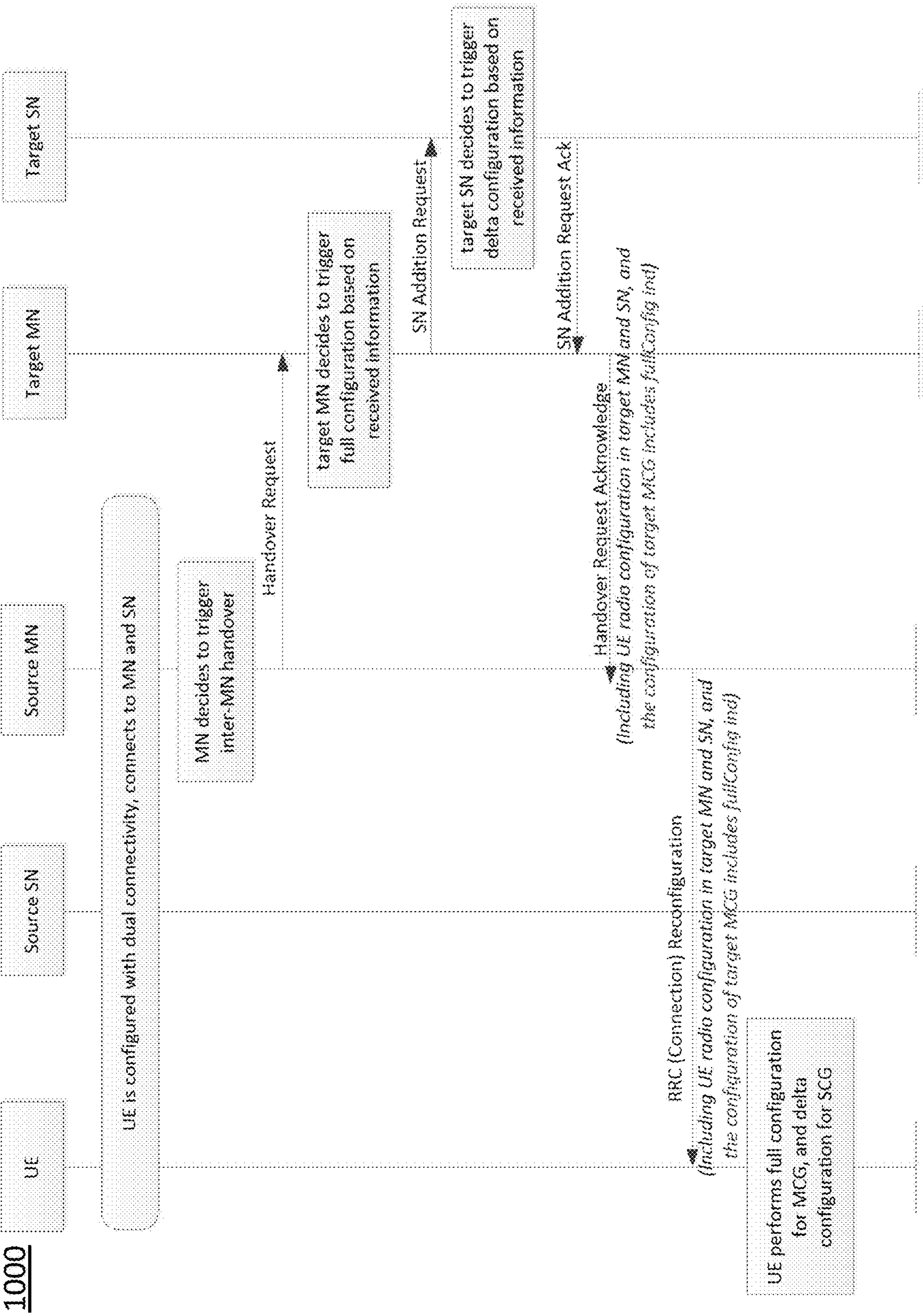
FIG. 10 shows an example method 1000 of implementing full configuration.

FIG. 10 shows an example method 1000 of implementing full configuration. In this example, an EN-DC UE is connected to eNB (MN) and gNB (SN). The network triggers an inter-MN handover without an SN change procedure. During this procedure, the target MN decides to trigger a full configuration for an MCG, and the target SN triggers a delta configuration for an SCG.

The RRC reconfiguration (handover command) message is sent by the source MN. The RRC reconfiguration message includes aa target MCG configuration and a target SCG configuration. In addition, the target MCG configuration also includes a full configuration indication, with value set to "true".

After the UE receives the RRC reconfiguration (handover command) message, the UE decodes the received MCG configuration, and then based on the embedded full configuration indication, the UE discards one or more of following configurations currently configured for the MCG: Radio configuration, RLC bearer configuration, PDCP bearer configuration, measurement configuration, or security configuration. Then the UE applies the new MCG configuration. For SCG, after the UE decodes the received SCG configuration, since a full configuration indication for SCG was not received, the UE can directly apply the received new SCG configuration.

EXAMPLE 3

Figure 11:
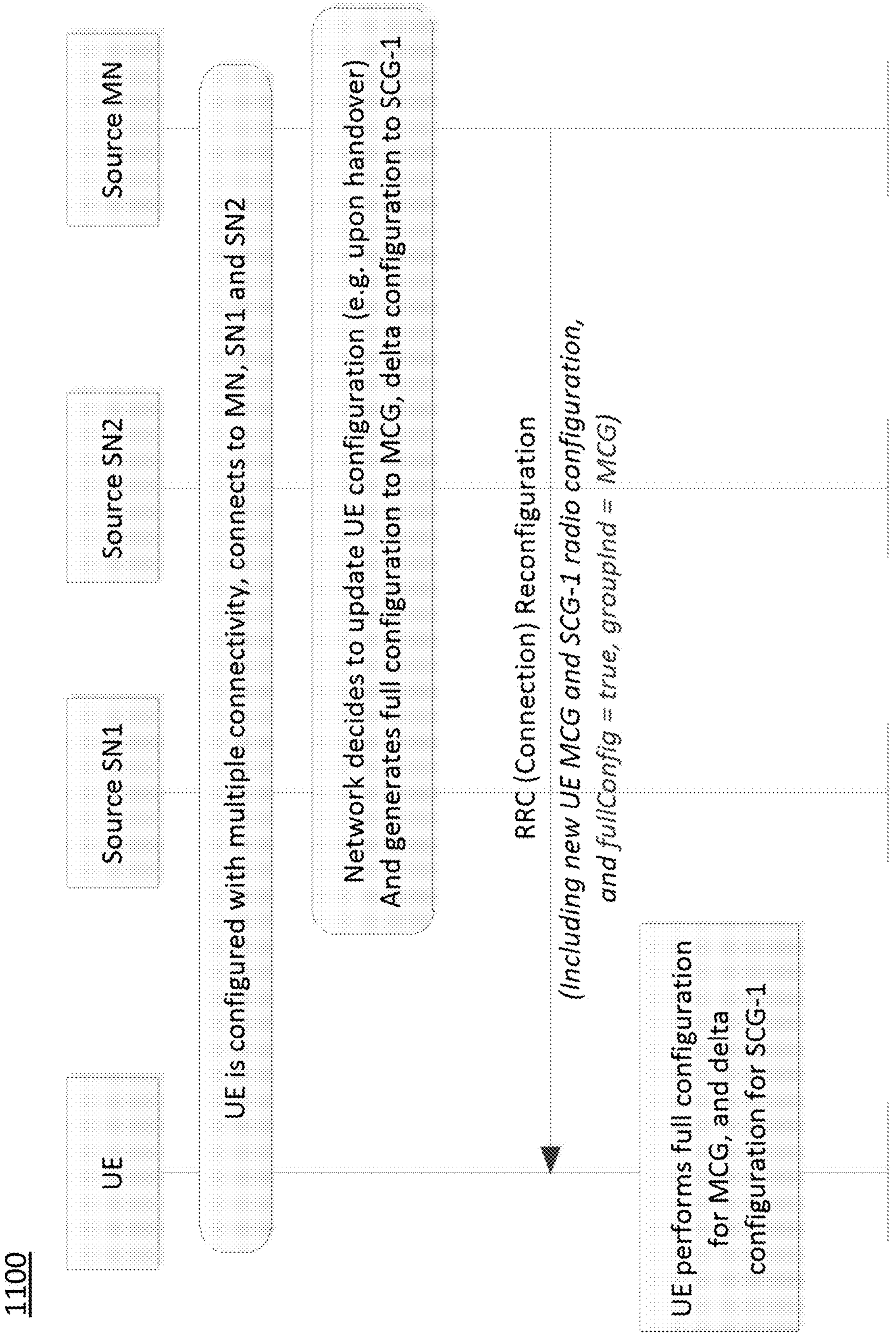
FIG. 11 shows an example method 1100 of implementing full configuration.

FIG. 11 shows an example method 1100 of implementing full configuration. In this example, a UE is established with multiple connectivity. The UE is configured with 3 cell groups, named as MCG, SCG-1, and SCG-2 respectively. The network triggers a cell group change, where the configuration of an MCG and SCG-1 will be changed. Specifically, the network triggers a full configuration for the MCG and a delta configuration for SCG-1 when updating the configuration.

The network sends an RRC reconfiguration message to the UE. The message includes a new RRC configuration for MCG and a new RRC configuration for SCG-1. In addition, the message also includes a full configuration indication with value set to "true" and an associated indication "MCG".

After the UE receives the RRC reconfiguration message, based on the received full configuration indication and associated indication "MCG", the UE discards one or more of following configurations currently configured for MCG: Radio configuration, RLC bearer configuration, PDCP bearer configuration, measurement configuration, or security configuration. Then the UE applies the new received MCG configuration.

In addition, for SCG-1, since a full configuration indication is not received, the UE can directly apply the received SCG-1 configuration. During this procedure, the configuration for SCG-2 is not impacted.

During this procedure, the MCG, SCG-1 and SCG-2 can be in any state, such as an activation state, a deactivation state, or a dormancy state.

EXAMPLE 4

Figure 12:
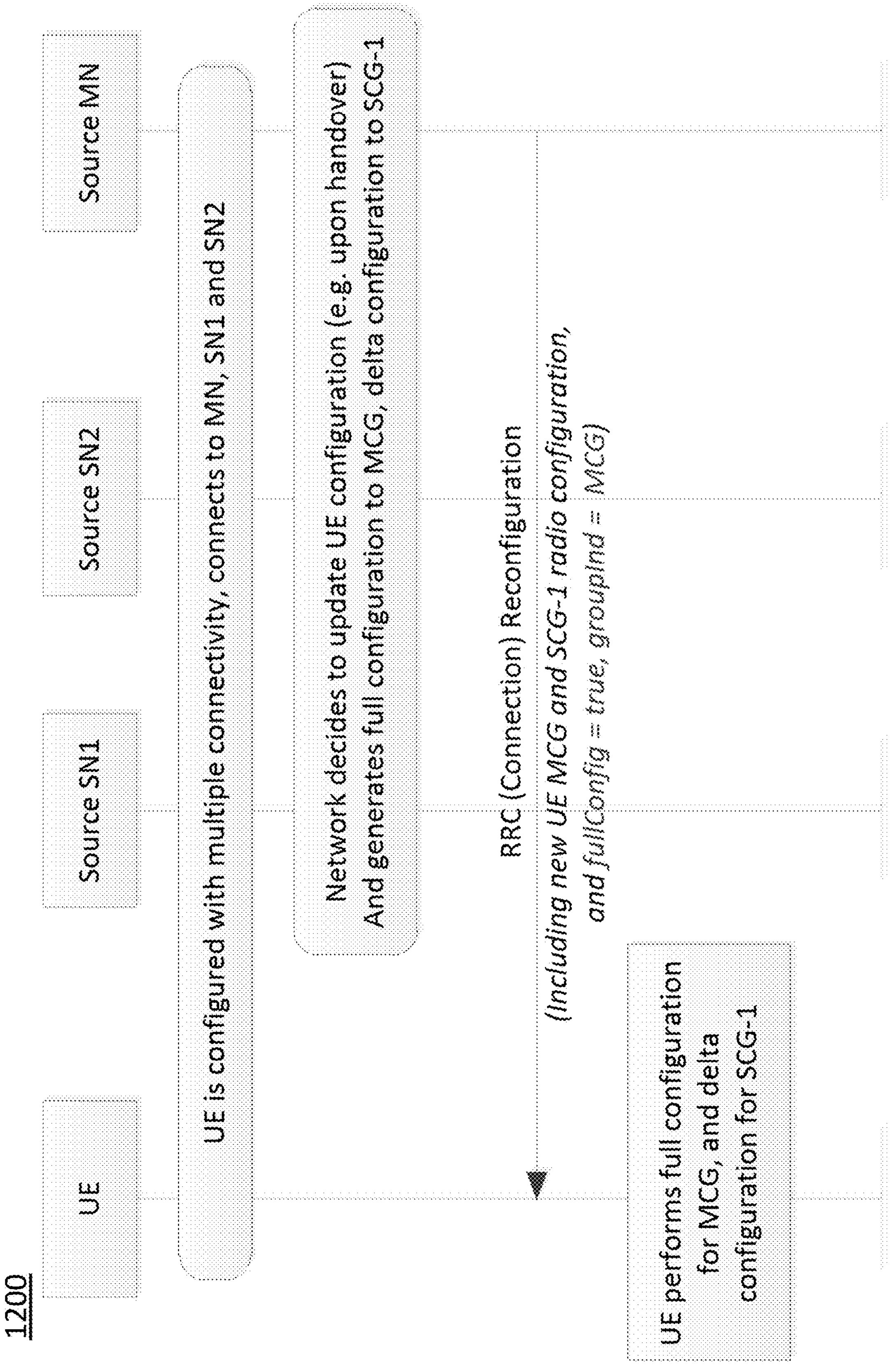
FIG. 12 shows an example method 1200 of implementing full configuration.

FIG. 12 shows an example method 1200 of implementing full configuration. In this example, a UE is established with multiple connectivity. The UE is configured with 3 cell groups, with group index 0, 1 and 2 respectively. Network triggers a cell group change, where the configuration of cell group 2 will be changed. Moreover, the network decides to trigger a full configuration for cell group 2 when updating the configuration.

Network sends an RRC reconfiguration message to the UE. The message includes a new RRC configuration for cell group 2. In addition, the message also includes a full configuration indication with value set to "true", along with a mapping index that indicates "cell group 2".

After the UE receives the RRC reconfiguration message, based on the received full configuration indication and mapping index "cell group 2", the UE discards one or more of following configurations currently configured for cell group 2: Radio configuration, RLC bearer configuration, PDCP bearer configuration, measurement configuration, security configuration. Then the UE applies the new received configuration for cell group 2.

During this procedure, the configuration for other cell groups, i.e., cell group 0 and cell group 1, are not impacted.

EXAMPLE 5

Figure 13:
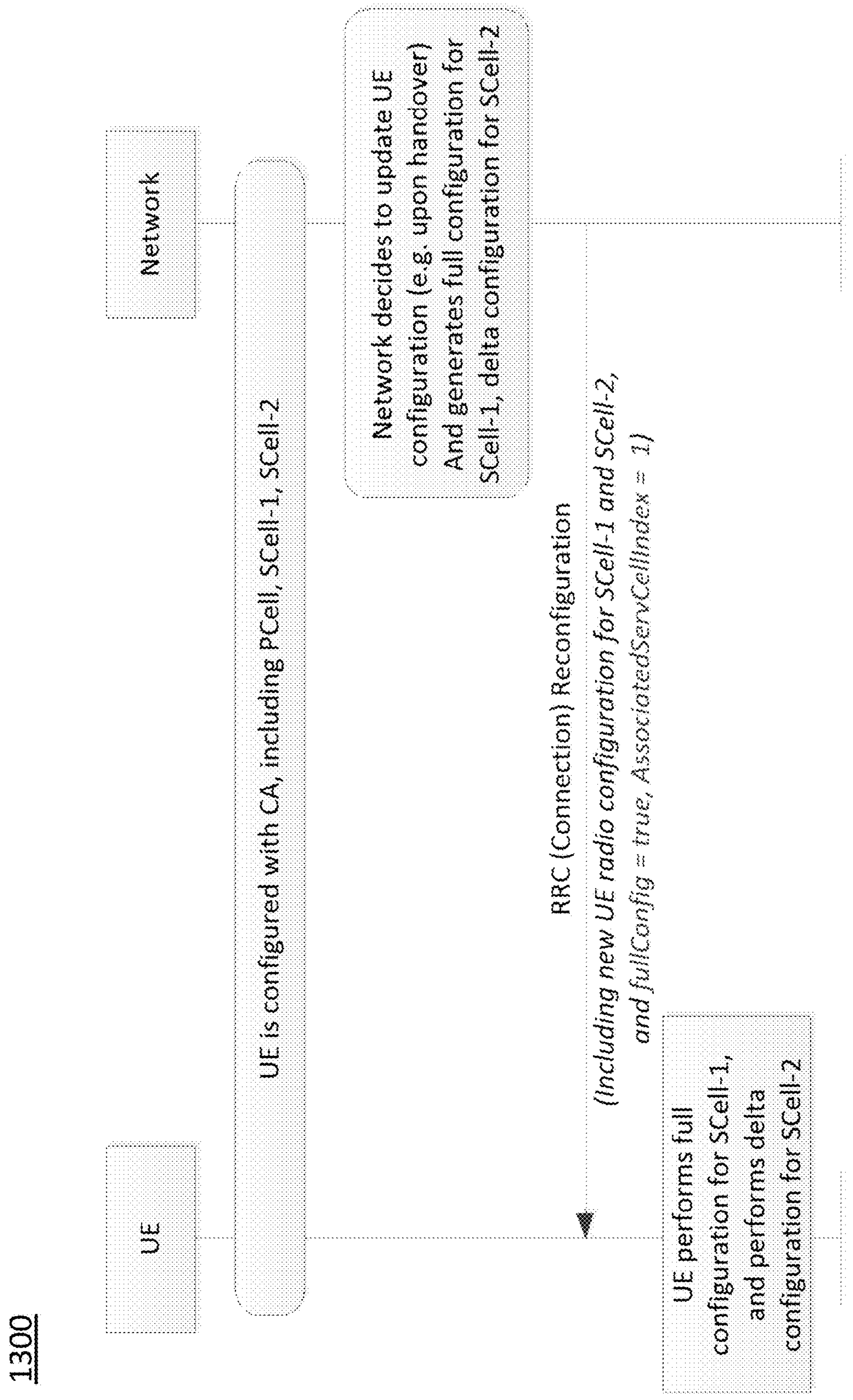
FIG. 13 shows an example method 1300 of implementing full configuration.

FIG. 13 shows an example method 1300 of implementing full configuration. In this example, a UE is configured with carrier aggregation (CA). The UE is configured with 3 serving cells: PCell, SCell-1, and SCell-2, with cell index 0, 1, and 2 respectively. The network triggers an SCell change, where the configuration of SCell-1 and SCell-2 will be changed. Moreover, the network triggers a full configuration for SCell-1 and a delta configuration for SCell-2 when updating the configuration.

The network sends an RRC reconfiguration message to the UE. The RRC reconfiguration message includes a new RRC configuration for SCell-1 and a new RRC configuration for SCell-2. In addition, the message also includes a full configuration indication with value set to "true", along with a mapping index indicates "serving cell index 1".

After the UE receives the RRC reconfiguration message, based on the received full configuration indication and mapping index "serving cell index 1", the UE discards one or more of following configurations currently configured for SCell-1: Radio configuration, RLC bearer configuration, PDCP bearer configuration, measurement configuration, or security configuration. Then the UE applies the new received configuration for SCell-1.

In addition, for SCell-2, since a full configuration indication was not received, the UE can directly apply the received new SCell-2 configuration. During this procedure, the configuration for other serving cells, i.e., PCell, is not impacted.

During this procedure, the PCell, SCell-1, and SCell-2 can be in any state, such as an activation state, a deactivation state, or a dormancy state.

EXAMPLE 6

Figure 14:
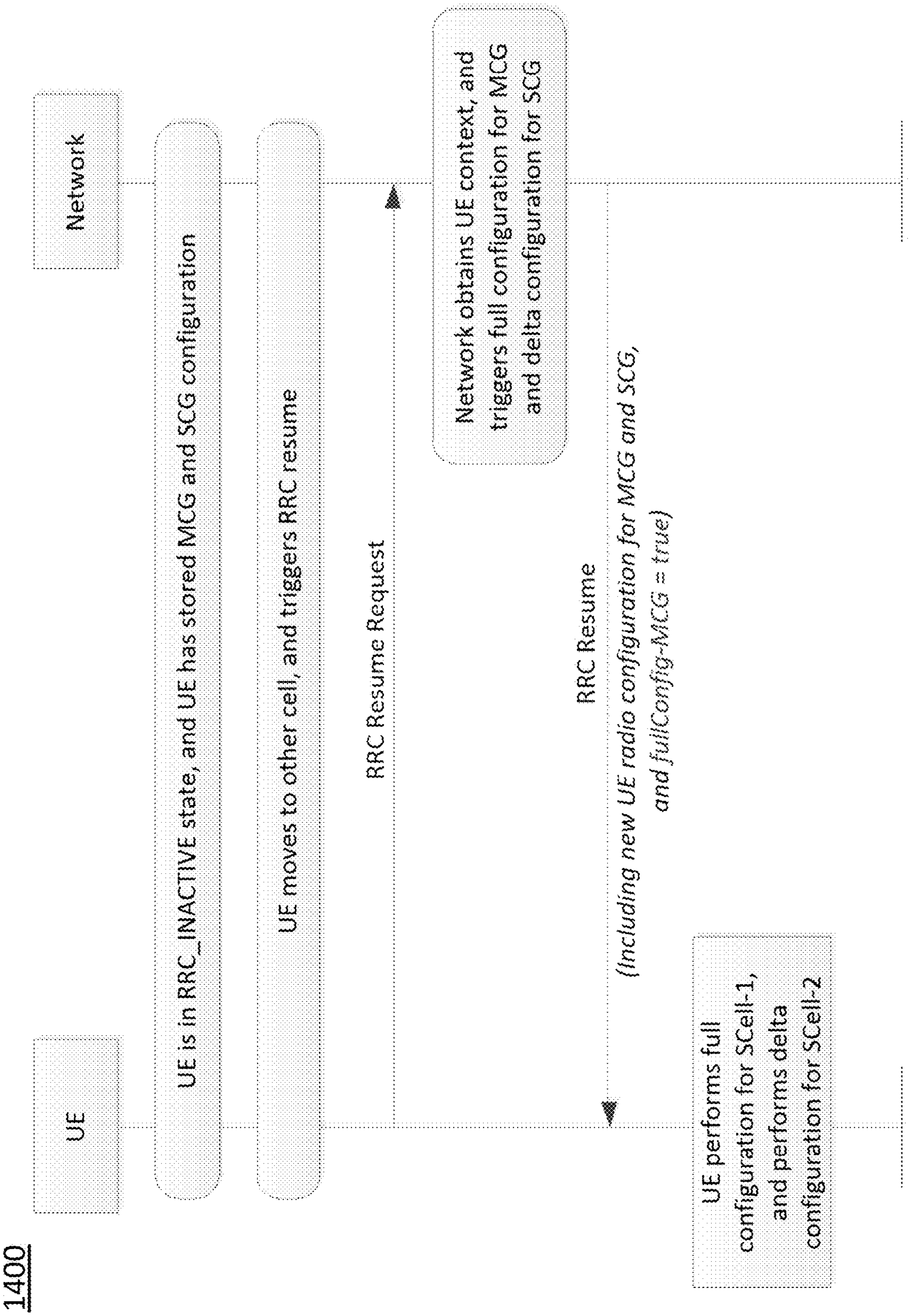
FIG. 14 shows an example method 1400 of implementing full configuration.

FIG. 14 shows an example method 1400 of implementing full configuration. In this example, an NR-DC UE is released to an RRC_INACTIVE state. During the RRC_INACTIVE state, the UE stores an MCG and SCG configuration configured by a network. Later, the UE moves to the coverage of another cell and triggers an RRC resume procedure to enter an RRC_CONNECTED state. After receiving the RRC Resume Request message from the UE, the new network obtains the UE's previous MCG and SCG context from the previous network, and the new network triggers a full configuration for MCG and a delta configuration for SCG during the RRC resume procedure.

The new network sends a RRC Resume message to the UE. The message includes a new RRC configuration for MCG and a new RRC configuration for SCG. In addition, the message also includes a full configuration indication. The full configuration indication is named, for example, "fullConfig-MCG" or "fullConfig-MN", with value set to true.

After the UE receives the RRC Resume message, based on the received full configuration indication, the UE discards one or more of following configurations stored for MCG: Radio configuration, RLC bearer configuration, PDCP bearer configuration, measurement configuration, or security configuration. Then the UE applies the new received configuration for the MCG. For SCG, since a full configuration indication was not received, the UE can directly apply the received new SCG configuration.

EXAMPLE 7

Figure 15:
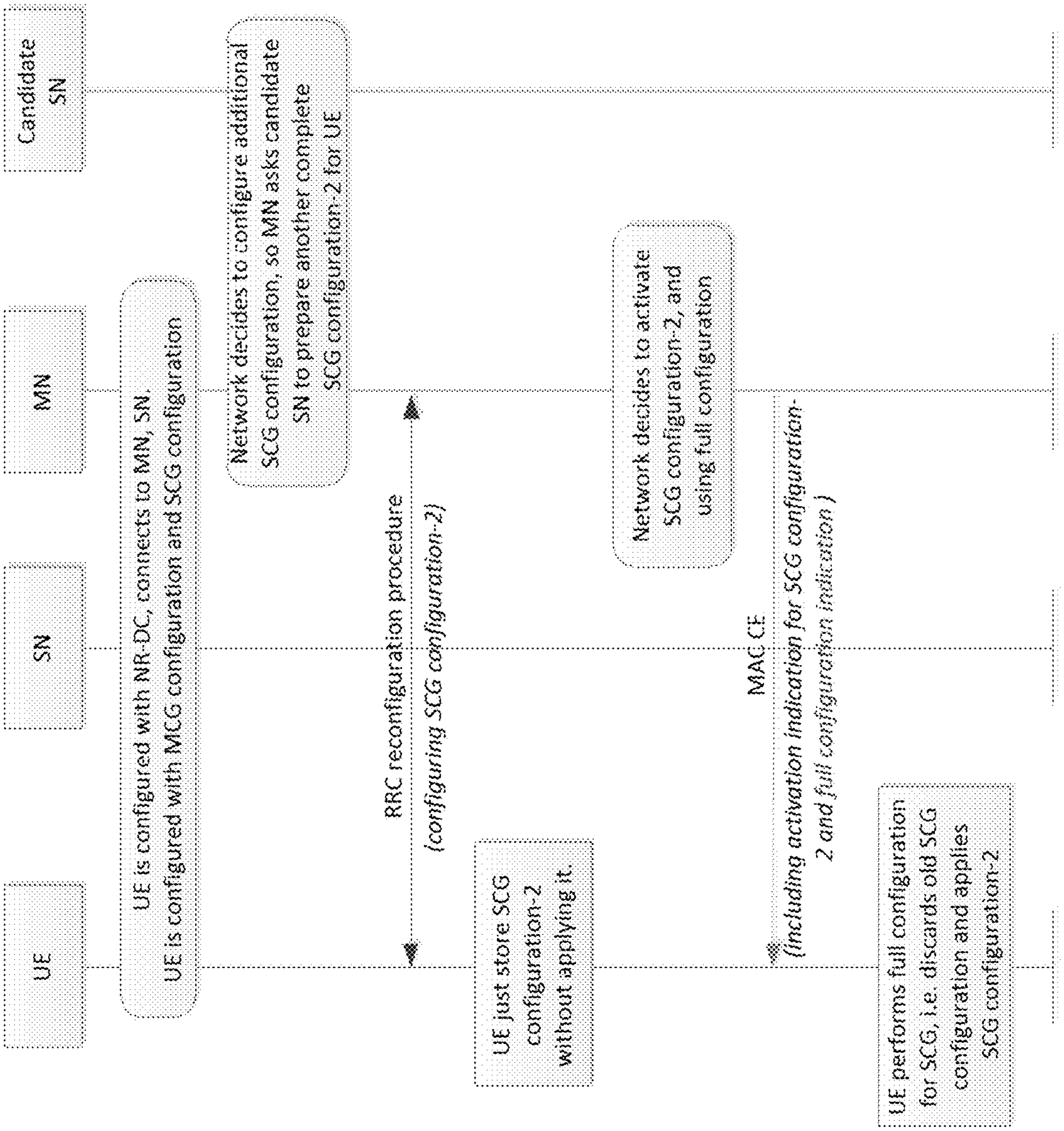
FIG. 15 shows an example method 1500 of implementing full configuration.

FIG. 15 shows an example method 1500 of implementing full configuration. In this example, an RRC_CONNECTED UE is configured with NR-DC. The UE is configured with MCG and an SCG. In addition, the UE is configured with an SCG configuration-2 provided by another candidate SN, but the SCG configuration-2 is not applied by the UE. The UE just stores the configuration.

The network wants to activate the SCG configuration-2 and to apply the configuration using full configuration. The network sends MAC CE to the UE, including an activation indication for the SCG configuration-2 and a full configuration indication associated with the configuration.

After the UE receives the MAC CE, based on the received full configuration indication, the UE discards one or more of following configurations currently configured for SCG: Radio configuration, RLC bearer configuration, PDCP bearer configuration, measurement configuration, or security configuration. Then the UE applies the SCG configuration-2 for SCG.

Figure 16:
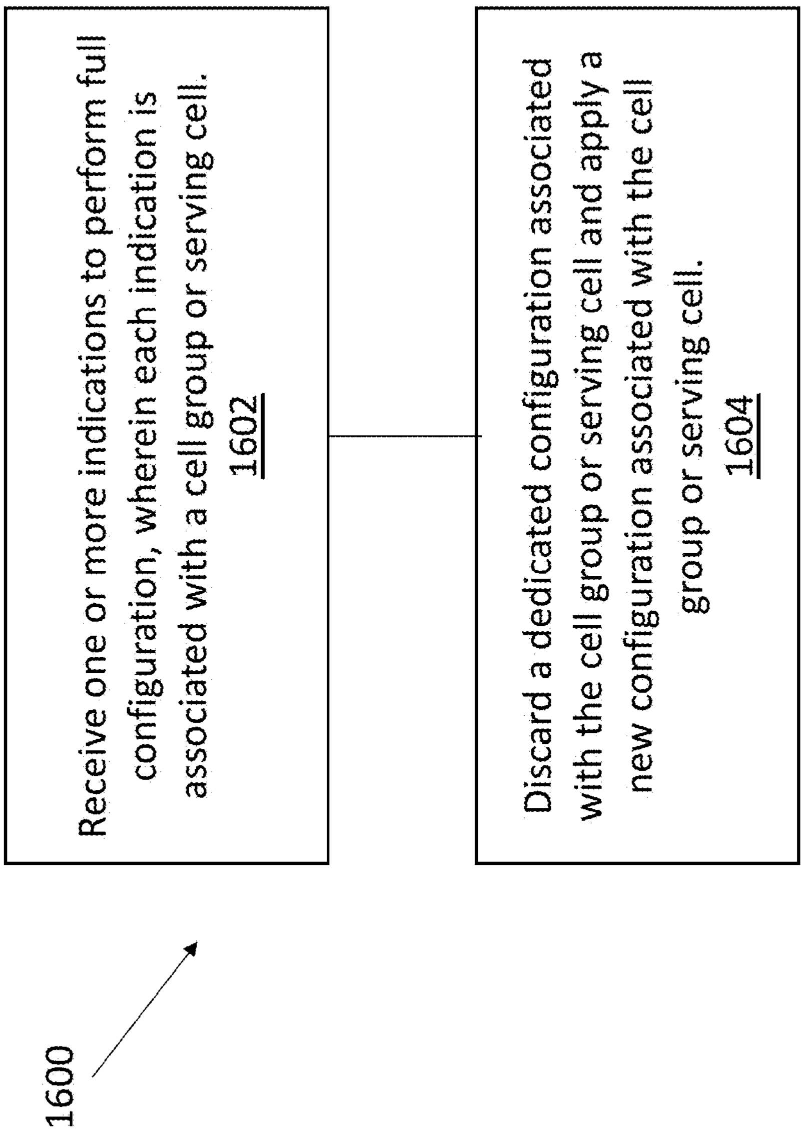
FIG. 16 shows an example method 1600 of implementing full configuration.

FIG. 16 shows an example method 1600. At 1602, one or more indications to perform full configuration are received, wherein each indication is associated with a cell group or serving cell. At 1604, a dedicated configuration associated with the cell group or the serving cell is discarded and a new configuration associated with the cell group or serving cell is applied. The dedicated configuration can comprise at least one or more of: a radio configuration, a radio link control (RLC) bearer configuration, a packet data convergence protocol (PDCP) bearer configuration, a measurement configuration, or a security configuration. The cell group or serving cell can be in an activation state, a deactivation state, or a dormancy state. Each indication can comprise a parameter. The parameter can have a value range including one or more of: MCG, SCG, PCell, PSCell, MCG SCell, or SCG SCell. The parameter can indicate an index of the cell group or the serving cell. The wireless device can be caused to discard the dedicated configuration based on a name of the parameter. Each indication can be carried in a message associated with the serving cell or the cell grop, and the wireless device can be caused to discard the dedicated configuration based on the serving cell or the cell group associated with the message. Each indication can be transmitted in an RRC message, such as RRC Reconfiguration, RRC Resume, or RRC Restablishment. Each indication can be transmitted in a MAC CE or DCI.

Some embodiments may preferably incorporate the following solutions as described herein.

For example, the solutions listed below may be used by a network device for implementing UE configuration as described herein.

1. A method of wireless communication method (e.g., method 800 described in FIG. 8) comprising: receiving (802), at a first network node, a first message from a second network node, the first message including first configuration release information corresponding to user equipment (UE) configuration information associated with the second network node; and transmitting (804), from the first network node, a second message including second configuration release information to a third network node.
2. The method of solution 1, further comprising: determining, by the third network node, whether to use full configuration based on the second configuration release information.
3. The method of solution 1, wherein the second configuration release information corresponds to: the UE configuration information associated with the second network node, and/or UE configuration information associated with the first network node.
4. The method of solution 1, further comprising: transmitting, from the third network node, a third message including third configuration release information to a fourth network node; and determining, by the fourth network node, whether to use full configuration based on the third configuration release information.
5. The method of solution 4, wherein the third configuration release information corresponds to the UE configuration information associated with the second network node.
6. The method of solution 1, wherein the first message is received at the first network node in response to receiving, at the second network node from the first network node, a configuration query request.
7. The method of solution 1, wherein the first message is received at the first network node when configuring or updating the UE configuration information associated with the second network node.
8. The method of solution 1, wherein the first network node is a central unit (CU), the second network node is a first distributed unit (DU), and the third network node is a second distributed unit (DU).
9. The method of solution 1, wherein the first network node is a first central unit (CU), the second network node is a distributed unit (DU), and the third network node is a second central unit (CU).
10. The method of solution 1, wherein the first network node is a master node (MN), the second network node is a first secondary node (SN), and the third network node is a second secondary node (SN).
11. The method of solution 1, wherein the first network node is a first master node (MN), the second network node is a secondary node (SN), and the third network node is a second master node (MN).
12. The method of solution 1, wherein the first configuration release information and second configuration release information are associated with one of: a UE; a serving cell; a cell group; a function; the serving cell and the function; or the cell group and the function.
13. The method of solution 1, wherein the first configuration release information and second configuration release information includes a general release version number or a detailed release version number.
14. The method of solution 4, wherein the first configuration release information, the second configuration release information, and the third configuration release information are associated with one of: a UE; a serving cell; a cell group; a function; the serving cell and the function; or the cell group and the function.
15. The method of solution 4, wherein the first configuration release information, the second configuration release information, and the third configuration release information includes a general release version number or a detailed release version number.
16. The method of solution 4, wherein the first network node is a central unit (CU), the second network node is a first distributed unit (DU), the third network node is a second central unit (CU), and the fourth network node is a second distributed unit (DU).
17. The method of solution 4, wherein the first network node is a first master node (MN), the second network node is a secondary node (SN), the third network node is a second master node (MN), and the fourth network node is a second secondary node (SN).

For example, the solutions listed below may be used by wireless device implementations for implementing full configuration as described herein.

18. A wireless communication method (e.g., method 1600 as described in FIG. 16) comprising: receiving (1602), at a wireless device, one or more indications to perform full configuration, wherein each indication is associated with a cell group or a serving cell; discarding (1604) a dedicated configuration associated with the cell group or the serving cell; and applying (1604) a new configuration associated with the cell group or the serving cell.
19. The method of solution 18, wherein the dedicated configuration comprises at least one or more of: a radio configuration, a radio link control (RLC) bearer configuration, a packet data convergence protocol (PDCP) bearer configuration, a measurement configuration, or a security configuration.
20. The method of solution 18, wherein the cell group is in an activation state, a deactivation state, or a dormancy state.
21. The method of solution 18, wherein the serving cell is in an activation state, a deactivation state, or a dormancy state.
22. The method of solution 18, wherein the indication comprises a parameter, a value range of the parameter including one or more of: MCG, SCG, PCell, PSCell, MCG SCell, or SCG SCell.
23. The method of solution 18, wherein each indication comprises a parameter indicating an index of a cell group or serving cell.
24. The method of solution 18, wherein each indication comprises a parameter and the discarding the dedicated configuration is based on a name of the parameter.
25. The method of solution 18, wherein each indication is carried in a message associated with the serving cell or the cell group, and wherein the discarding the dedicated configuration is based on the serving cell or the cell group associated with the message.
26. The method of solution 18, wherein each indication is received in a radio resource control (RRC) message.

27. The method of solution 26, wherein the RRC message is an RRC Reconfiguration message, an RRC Resume message, or an RRC Reestablishment message.
28. The method of solution 18, wherein each indication is received in a MAC Control Element (MAC CE) or downlink control information (DCI).

For example, the solutions listed below may be used by a network device for implementing full configuration as described herein.

29. A wireless communication method comprising:
transmitting, to a wireless device, one or more indications to perform full configuration, wherein each indication is associated with a cell group or a serving cell; and
causing the wireless device to discard a dedicated configuration associated with the cell group or the serving cell and apply a new configuration associated with the cell group or the serving cell.
30. The method of solution 29, wherein the dedicated configuration comprises at least one or more of: a radio configuration, a radio link control (RLC) bearer configuration, a packet data convergence protocol (PDCP) bearer configuration, a measurement configuration, or a security configuration.
31. The method of solution 29, wherein the cell group is in an activation state, a deactivation state, or a dormancy state.
32. The method of solution 29, wherein the serving cell is in an activation state, a deactivation state, or a dormancy state.
33. The method of solution 29, wherein the indication comprises a parameter, a value range of the parameter including one or more of: MCG, SCG, PCell, PSCell, MCG SCell, or SCG SCell.
34. The method of solution 29, wherein each indication comprises a parameter indicating an index of a cell group or serving cell.
35. The method of solution 29, wherein each indication comprises a parameter and the wireless device is caused to discard the dedicated configuration based on a name of the parameter.
36. The method of solution 29, wherein each indication is carried in a message associated with the serving cell or the cell group, and wherein the wireless device selects the dedicated configuration based on the serving cell or the cell group associated with the message.
37. The method of solution 29, wherein each indication is transmitted in a radio resource control (RRC) message.
38. The method of solution 37, wherein the RRC message is an RRC Reconfiguration message, an RRC Resume message, or an RRC Reestablishment message.
39. The method of solution 29, wherein each indication is transmitted in a MAC Control Element (MAC CE) or downlink control information (DCI).
40. An apparatus for wireless communication comprising a processor configured to implement the method of any of solutions 1 to 39.
41. A computer readable medium having code stored thereon, the code when executed by a processor, causing the processor to implement a method recited in any of solutions 1 to 39.

Figure 17:
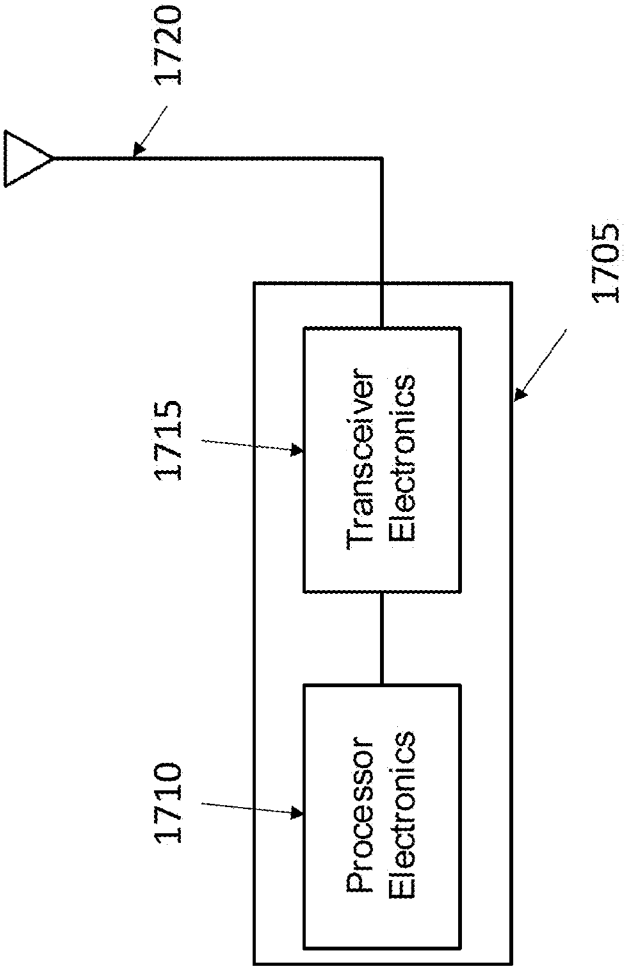
FIG. 17 is a block diagram representation of a portion of an apparatus that can be used to implement methods and/or techniques of the presently disclosed technology.

FIG. 17 is a block diagram representation of a portion of an apparatus, in accordance with some embodiments of the presently disclosed technology. An apparatus 1705 such as a network device or a base station or a wireless device (or UE), can include processor electronics 1710 such as a microprocessor that implements one or more of the techniques presented in this document. The apparatus 1705 can include transceiver electronics 1715 to send and/or receive wireless signals over one or more communication interfaces such as antenna(s) 1720. The apparatus 1705 can include other communication interfaces for transmitting and receiving data. Apparatus 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the apparatus 1705.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

The invention claimed is:

1. A wireless communication method, comprising:

receiving, at a wireless device, an indication to perform full configuration, wherein the indication is associated with a first serving cell of a plurality of serving cells;

discarding a dedicated configuration associated with the first serving cell; and applying a new configuration associated with the first serving cell while maintaining configurations of serving cells other than the first serving cell of the plurality of serving cells.

2. The wireless communication method of claim 1, wherein the dedicated configuration comprises at least one of:

a radio configuration, a radio link control (RLC) bearer configuration, a packet data convergence protocol (PDCP) bearer configuration, a measurement configuration, or a security configuration.

3. The wireless communication method of claim 1, wherein the first serving cell is in an activation state, a deactivation state, or a dormancy state.

4. The wireless communication method of claim 1, wherein the indication comprises a parameter, a value range of the parameter including at least one of: primary cell (PCell), primary secondary cell (PSCell), MCG secondary cell (SCell), or SCG SCell.

5. The wireless communication method of claim 1, wherein the indication comprises a parameter indicating an index of the first serving cell.

6. The wireless communication method of claim 1, wherein the indication comprises a parameter, and the discarding the dedicated configuration is based on a name of the parameter.

7. The wireless communication method of claim 1, wherein the indication is carried in a message associated with the first serving cell, and wherein the discarding the dedicated configuration is based on the first serving cell associated with the message.

8. The wireless communication method of claim 1, wherein the indication is received in a radio resource control (RRC) message, and wherein the RRC message is an RRC Reconfiguration message, an RRC Resume message, or an RRC Reestablishment message.

9. The wireless communication method of claim 1, wherein the indication is received in a MAC Control Element (MAC CE) or downlink control information (DCI).

10. A wireless communication method comprising:

transmitting, to a wireless device, an indication to perform full configuration, wherein the indication is associated with a first serving cell of a plurality of serving cells; and causing the wireless device to discard a dedicated configuration associated with the first serving cell and apply a new configuration associated with the first serving cell while maintaining configurations of serving cells other than the first serving cell of the plurality of serving cells.

11. The wireless communication method of claim 10, wherein the dedicated configuration comprises at least one of:

a radio configuration, a radio link control (RLC) bearer configuration, a packet data convergence protocol (PDCP) bearer configuration, a measurement configuration, or a security configuration.

12. The wireless communication method of claim 10, wherein the first serving cell is in an activation state, a deactivation state, or a dormancy state.

13. The wireless communication method of claim 10, wherein the indication comprises a parameter indicating an index of the first serving cell.

14. The wireless communication method of claim 10, wherein the indication is carried in a message associated with the first serving cell, and wherein the wireless device selects the dedicated configuration based on the first serving cell associated with the message.

15. The wireless communication method of claim 10, wherein the indication is transmitted in a radio resource control (RRC) message.

16. The wireless communication method of claim 10, wherein the indication is transmitted in a MAC Control Element (MAC CE) or downlink control information (DCI).

17. A wireless device, comprising:

at least one processor configured to:

receive, via a receiver, an indication to perform full configuration, wherein the indication is associated with a first serving cell of a plurality of serving cells;

discard a dedicated configuration associated with the first serving cell; and apply a new configuration associated with the first serving cell while maintaining configurations of serving cells other than the first serving cell of the plurality of serving cells.

18. A wireless node, comprising:

at least one processor configured to:

transmit, via a transmitter to a wireless device, an indication to perform full configuration, wherein the indication is associated with a first serving cell of a plurality of serving cells; and cause the wireless device to discard a dedicated configuration associated with the first serving cell and apply a new configuration associated with the first serving cell while maintaining configurations of serving cells other than the first serving cell of the plurality of serving cells.

* * * * *